Figure 1:
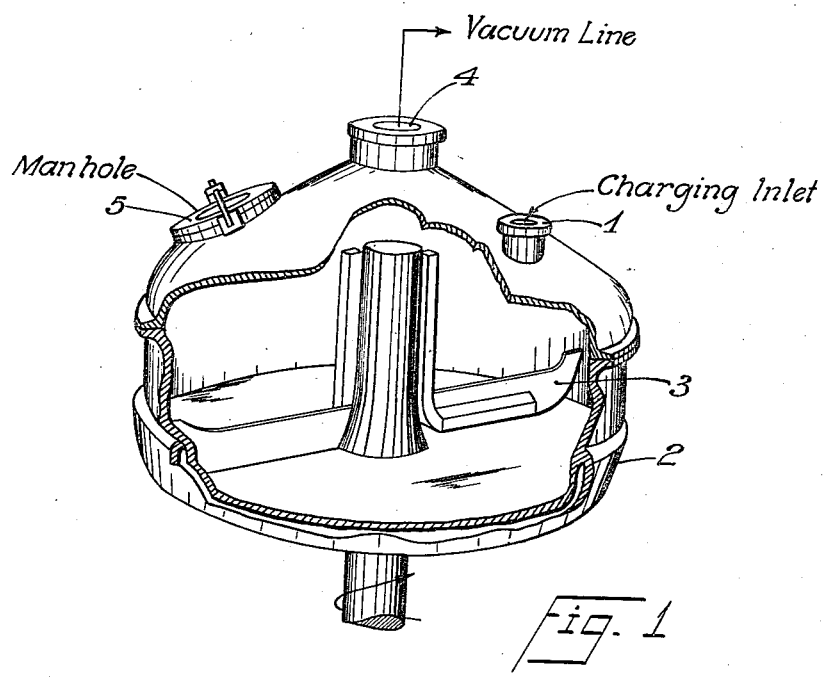

Sept. 26, 1939.  W. B. GIDEON ET AL  2,174,238
MANUFACTURE OF AMMONIUM NITRATE
Filed July 18, 1936

William B. Gideon
Thorvald W. Hauff   INVENTORS

BY
Benton A. Bull   ATTORNEY

Patented Sept. 26, 1939

2,174,238

UNITED STATES PATENT OFFICE 2,174,238

MANUFACTURE OF AMMONIUM NITRATE

William B. Gideon, Du Pont, Wash., and Thorvald W. Hauff, Woodbury, N. J., assignors to E. I. du Pont de Nemours & Company, Wilmington, Del., a corporation of Delaware Application July 18, 1936, Serial No. 91,304

6 Claims. (Cl. 23—103)

This invention relates to a new and improved process for producing substantially dry ammonium nitrate characterized by low density, and more particularly to such a process wherein the removal of the last traces of water is facilitated.

Ammonium nitrate is a material of great industrial importance and its commercial production is carried out on a very large scale. Because of the affinity of the material for water, considerable difficulty is met in the recovery of the dry product from solutions resulting from the neutralization of nitric acid with ammonia. One method, for example, comprises evaporation of the ammonium nitrate solution to a moderate extent and separation of the crystals of the material on cooling, with subsequent further evaporation of the mother liquor and separation of additional crystals.

According to a second method, the neutralized solution of ammonium nitrate is evaporated to a very low water content, between 2 and 10% for example. The solution is maintained at a high temperature and the molten mass is cooled with agitation, whereby a grained product is obtained. In both of the methods described, the removal of the last traces of water is very difficult and, according to the second method, the maintenance of a large quantity of substantially molten ammonium nitrate for considerable periods of time at high temperatures presents a certain amount of hazard. The removal of the last few per cent of water at lower temperatures during the final graining process is also a time-consuming and inefficient operation.

A more recent method has consisted in continuous evaporation of ammonium nitrate solutions by passing such solutions in the form of a thin layer or film over a heated surface maintained sufficiently above the fusion point of ammonium nitrate, and its solutions with small percentages of water, so that substantially complete removal of the water is effected. The product of this last process is an anhydrous melt, which may be solidified, for example, by spraying or atomizing into a suitable chamber.

One of the outstanding fields of use of ammonium nitrate is in the manufacture of commercial explosives, where this material has become increasingly important as an explosive ingredient and as a replacement of nitroglycerin. In many of the ammonium nitrate explosives, this material is used in amounts in excess of 50% of the total. It is important that this ingredient be substantially free from moisture, since the presence of even a few tenths of a per cent of water may cause setting of the finished explosive, with consequent loss in sensitiveness to propagation. In many grades of high explosives also, it is desirable to employ an ammonium nitrate of very low apparent density, since this furnishes a highly efficient method of obtaining a low density final product, which is a desideratum of the industry. Methods of the prior art for producing ammonium nitrate have attained a dry product, though with considerable operative difficulties and power consumption. Less success has been met in producing a satisfactorily low density product of controlled uniformity. Whereas suitable material of a density of 1.0 and even of 0.85 can be obtained by processes of the prior art, the production of ammonium nitrate of densities below 0.8, and particularly below 0.6, has not been accomplished satisfactorily.

An object of our invention is an improved method for the production of dry ammonium nitrate characterized by low density. A further object is such a method wherein the removal of the last traces of water from the material is facilitated. A further object is such a method in which the uniform production of unusually low density material is made possible. A still further object is the low density product resulting from such process. Additional objects will be disclosed as the invention is further described hereinafter.

We have found that a dry, low density ammonium nitrate is produced with much advantage if a concentrated aqueous solution, for example one containing over 90% ammonium nitrate, is introduced into a chamber or container and subjected to reduced pressure. Preferably, the ammonium nitrate solution will be of a concentration of between 92 and 98%, and we prefer to operate under a condition of high vacuum, for example over 27 inches.

Ammonium nitrate solutions of a concentration of 90 to 98% are practically solutions of water in amonium nitrate and may be obtained by methods of the prior art. We may better consider such solutions as ammonium nitrate having a water content not greater than 10%. A convenient method of obtaining molten ammonium nitrate of low water content is that described in the copending application of Converse, Handforth and Harris, Serial No. 709,968, filed February 6, 1934, wherein concentration is effected by the passage of ammonium nitrate solutions over a heated surface in the form of a thin layer or film to facilitate the volatilization of the water. The preliminary concentration forms no part of our invention, however, and any method of removing the water down to the last few per cent may be followed.

Dry ammonium nitrate has a fusion point above 169° C., while material containing 2 and 10% water melts at approximately 147° and 95° C., respectively. Molten ammonium nitrate containing small amounts of water must, therefore, be maintained at a temperature sufficient to insure complete fluidity during handling. The molten salt at a suitably elevated temperature, for example at a 20° elevation above its crystallizing point, is introduced into a closed contained and there subjected to a pressure less than atmospheric, a vacuum of 29 inches for example. Under the reduced pressure prevailing, and because of the high temperature of the molten ammonium nitrate and the temperature of crystallization, the residual water boils off substantially completely. The escape of the water in vapor form causes the material to puff up to a greatly expanded form and results in a dry ammonium nitrate product permeated with cavities, and of consequent low packing density. Preferably the molten material is brought into contact with a hard, smooth surface, either an inclined or a moving surface. The temperature of this surface is maintained approximately at the temperature of the crystallizing mass to prevent absorption of heat from it. A relatively thin layer of material is introduced onto the solidifying surface at one time and the dry, solid ammonium nitrate is scraped off repeatedly. The molten material may be introduced into a chamber maintained under reduced pressure, or into a chamber at atmospheric pressure, and said chamber be subsequently evacuated. The essential condition is that the material shall be exposed during solidification to the reduced pressure condition.

Various procedures may be followed in carrying out our invention. We may, for example, feed the molten ammonium nitrate, of 6% water content onto an inclined or moving surface or onto the surface of a revolving drum within an area maintained under reduced pressure. The flow should be so controlled that the fluid adheres in a relatively thin layer to the surface. The ammonium nitrate melt loses its water content completely, fluffs up, becomes porous in nature, and may be scraped from the surface by suitable means arranged at some subsequent point.

Another method of operating consists in introducing a suitable amount of the molten ammonium nitrate, having the desired water content, into a container such as a vacuum graining kettle wherein the molten material is puffed under reduced pressure, preferably under high vacuum, with production of a dry product of low density. The simultaneous crystallization and water removal will take place very rapidly, and the expanded mass may then be broken down and removed, so that a continuous succession of operations involving first introduction of molten material and then removal of dry, low density ammonium nitrate will take place.

A particular advantage of our process lies in the fact that no added heat is required, since that obtained from the sensible heat and heat of crystallization is sufficient to evaporate the water present. It is only necessary to maintain the apparatus used sufficiently hot to prevent condensation or the absorption of heat from the molten material. It is evident, therefore, that this method can be employed to obtain a dry expanded and cooled product of the desired density at a minimum cost.

In order to describe our invention more clearly reference is made to the accompanying drawing which illustrates suitable equipment for carrying out our improved process. It is to be understood, however, that this is done solely by way of illustration and is not to be regarded as a limitation upon the scope of our invention.

Figure 2:
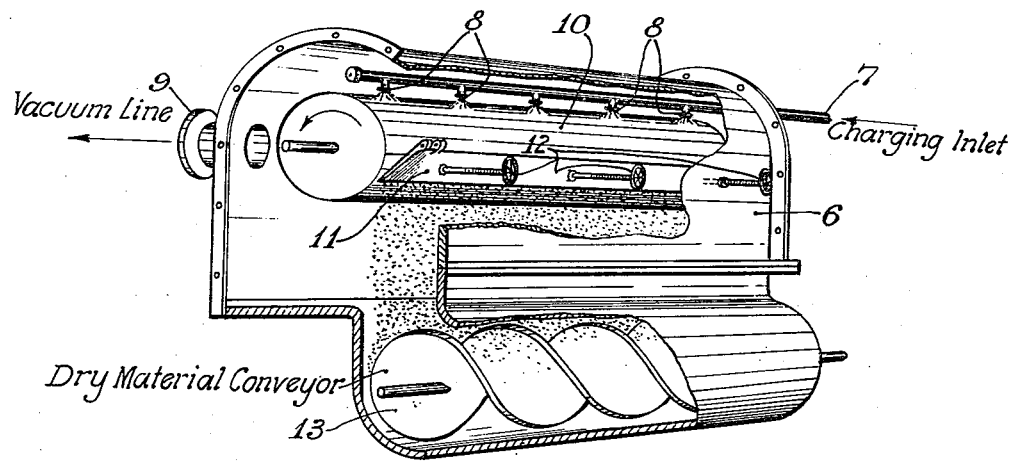

Referring generally to the drawing, Figure 1 is a view partly in section and partly in perspective of a vacuum graining kettle, while Figure 2 is a similar view of a vacuum drum drier of conventional design.

The batch method of operating in accordance with our invention may be illustrated with reference to Figure 1 of the drawing. This method of operation is carried out, for example, by charging 60 pounds of molten ammonium nitrate at a temperature of approximately 135° C., and containing 6.0% water, through the charging inlet 1 into the preheated, steam jacketed graining kettle 2 which contains a suitable plow 3 to assist in removing the product. The charging inlet is then closed and the kettle is exhausted to a vacuum of 27 inches, through the vacuum line 4 connected to a suitable vacuum pump. The amount of molten material introduced into the graining kettle is insufficient initially to occupy more than $\frac{1}{40}$ the anticipated final volume. Under the influence of the sensible heat of the melt and the heat of crystallization, the material loses its water substantially completely and solidifies to a very voluminous form of consequent low density. After the material is "fluffed" and dried to the desired extent, the plow 3 is then rotated to break up the material, which is then removed from the kettle through the man hole 5, and broken down to a suitable fineness. The product treated in the above manner will have a moisture content of about 0.07% and when broken down to pass a 20-mesh screen, has a density of about 0.59.

Referring now to Figure 2, the continuous method of operation in accordance with our invention may be carried out in the following manner. Molten ammonium nitrate of a water content of approximately 6%, and at a temperature of about 135° C., is introduced into the evacuated drum drier 6 through the charging inlet 7 which is provided with a distributor 8. The chamber is maintained under a vacuum of 18 inches by means of a suitable vacuum pump (not shown) connected to the vacuum line 9. The ammonium nitrate falls from the distributing devices 8 on the surface of a revolving drum 10 which is maintained at a temperature of aproximately 125° C. The flow of material is controlled so that only a thin layer is maintained on the drum's surface. The sensible heat of the material plus the heat of crystallization is sufficient to cause the water to escape from the molten material in vapor form under the reduced pressure prevailing, and at the same time to effect crystallization and cooling of the nitrate melt. As the drum rotates the dried product is scraped from the drum's surface by the blade 11 provided with a suitable adjusting means 12, and falls downwardly into the dry material conveyor 13 which may be, for example, a suitable screw conveyor. The material becomes a dry, porous mass almost immediately after contacting the drum. After the dried, "fluffed" material has been disintegrated to pass a 20-mesh screen, it possesses a density of about 0.42 and a water content of about 0.05%.

From the foregoing description of our process, its advantages over the methods of the prior art will be apparent. Whereas, in previous methods, the presence of water has been a liability at all times, a certain percentage of water is a necessity in our process in order to obtain a product of the desired properties. During the step in the process where the molten material is exposed in the evacuated chamber, the presence of the water in the molten material, and its escape in the form of a vapor simultaneously with the solidification process, causes the formation of the honeycombed structure and thin nitrate films which impart the desired and characteristic low density to the product.

In the description of our method, it has been shown that a porous product, full of cavities, results from the subjection of the molten and solidifying material to an atmosphere maintained under reduced pressure. This bulky material may possess a density in large lumps of less than 0.2. When broken down and screened, the material passing a 20-mesh was found consistently to have a density less than 0.5 and commonly between 0.3 and 0.45, this density being the one obtained by the standard method of first subjecting the material to compression in a brass cylinder by a pressure of 25 pounds per square inch. An amount of material is used such that the volume after compression will occupy between 25 and 30 cc. When the density of the material is referred to in our disclosure, the density by the method described is meant. It will be realized that a lower value would be obtained if the density were obtained on loose material or by mere tapping of the product into a measuring cylinder.

We have described our improved method in detail in the foregoing. It will be understood, however, that many variations may be introduced in details or operation without departing from the spirit of the invention. We intend, therefore, to be limited only by the following patent claims:

We claim:

1. The process of producing substantially dry ammonium nitrate characterized by low density and a puffed porous texture, which comprises introducing into a closed chamber a hot melt of ammonium nitrate of sufficiently low water content to be solid at ordinary temperatures, spreading said ammonium nitrate melt into a film over a heated surface within said chamber, and subjecting said molten material to a presure sufficiently below atmospheric to remove substantially all of the water from said material and solidify the same.

2. The process of producing substantially dry ammonium nitrate characterized by low density and a puffed porous texture, which comprises introducing into a closed chamber a hot melt of ammonium nitrate having a water content not greater than 10%, spreading said ammonium nitrate melt into a film over a heated surface within said chamber, and subjecting said molten material to a pressure sufficiently below atmospheric to cause the simultaneous removal of substantially all of the water and the solidification of said ammonium nitrate through utilization of the sensible heat and the latent heat of crystallization of the molten material.

3. The process of producing substantially dry ammonium nitrate characterized by low density and a puffed porous texture, which comprises introducing into a closed chamber a hot melt of ammonium nitrate at a temperature at least 20° above the solidification point of said nitrate, said melt having a water content between 2 and 8%, spreading said melt into a film over a heated surface therein, and subjecting said molten material to a pressure sufficiently below atmospheric to solidify said material substantially free from water.

4. A low density substantially dry ammonium nitrate product having a puffed porous texture produced by simultaneous evaporation and crystallization under reduced pressure of a film of a hot melt of ammonium nitrate having a water content of not more than 10%.

5. A puffed porous ammonium nitrate product having an apparent density lower than 0.5, said apparent density measurement being obtained by subjecting said product to compression in a brass cylinder by a pressure of 25 pounds per square inch, said product being produced by simultaneous evaporation and crystallization under reduced pressure of a film of a hot melt of ammonium nitrate having a water content of not more than 10%.

6. A puffed porous ammonium nitrate product having an apparent density between 0.3 and 0.5 said apparent density measurement being obtained by subjecting said product to compression in a brass cylinder by a pressure of 25 pounds per square inch, said product being produced by simultaneous evaporation and crystallization under reduced pressure of a film of a hot melt of ammonium nitrate having a water content of not more than 10%.

WILLIAM B. GIDEON.
THORVALD W. HAUFF.

CERTIFICATE OF CORRECTION.

Patent No. 2,174,238.                                September 26, 1939.

WILLIAM B. GIDEON, ET AL.

It is hereby certified that error appears in the printed specification of the above numbered patent requiring correction as follows: Page 1, second column, line 12, before "product" insert dry; page 2, first column, line 12, for the word "contained" read container; and that the said Letters Patent should be read with this correction therein that the same may conform to the record of the case in the Patent Office.

Signed and sealed this 7th day of November, A. D. 1939.

(Seal)

Henry Van Arsdale,
Acting Commissioner of Patents.